US012691564B2

(12) United States Patent
Craig et al.

(10) Patent No.: US 12,691,564 B2
(45) Date of Patent: Jul. 28, 2026

(54) IMPACT TOOL WITH GAS SPRING

(71) Applicant: MILWAUKEE ELECTRIC TOOL CORPORATION, Brookfield, WI (US)

(72) Inventors: Kentez L. Craig, Milwaukee, WI (US); Amith J. Baskaran, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 98 days.

(21) Appl. No.: 18/617,796

(22) Filed: Mar. 27, 2024

(65) Prior Publication Data

US 2024/0326220 A1 Oct. 3, 2024

Related U.S. Application Data

(60) Provisional application No. 63/455,013, filed on Mar. 28, 2023.

(51) Int. Cl.
*B25F 5/00* (2006.01)
*B25B 21/02* (2006.01)

(52) U.S. Cl.
CPC .............. *B25F 5/001* (2013.01); *B25B 21/02* (2013.01)

(58) Field of Classification Search
CPC ................................ B25F 5/001; B25B 21/02
See application file for complete search history.

(56) References Cited

U.S. PATENT DOCUMENTS 2,128,761 A * 8/1938 Thomas ................ B25B 21/026 464/25
2,476,632 A 7/1949 Shaff
2,563,711 A * 8/1951 Fitch ..................... B25B 21/026 173/93.6
2,720,956 A * 10/1955 Coombes ............ B25B 23/1453 173/93.6
2,973,071 A * 2/1961 Sturrock ............... B25B 21/026 173/93.6
3,181,672 A 5/1965 Swanson
(Continued)

FOREIGN PATENT DOCUMENTS

CN 216067235 U 3/2022
DE 4218816 A1 12/1993
(Continued)

*Primary Examiner* — Dariush Seif
(74) *Attorney, Agent, or Firm* — Michael Best & Friedrich LLP

(57) ABSTRACT

An impact power tool including a housing, a motor supported by the housing, a gear assembly driven by the motor, and an impact assembly driven by the gear assembly. The impact mechanism includes a camshaft, an anvil, and a hammer. The camshaft is coupled to the output of gear assembly and rotates about a rotation axis. The anvil is rotatably supported by the housing and can receive a tool bit. The hammer rotates and moves axially along the camshaft and is configured to selectively impact the anvil. When a reaction torque is greater than a threshold value is applied to the anvil, the hammer moves in a first direction away from the anvil and simultaneously compresses a compressible fluid. At a maximum distance from the anvil, the compressible fluid begins to exert a restoring force on the hammer and moves the hammer in a second direction towards the anvil.

18 Claims, 3 Drawing Sheets

(56) References Cited

U.S. PATENT DOCUMENTS

| | | | | |
|---|---|---|---|---|
| 3,428,137 | A * | 2/1969 | Schaedler | B25B 21/02 464/36 |
| 3,714,994 | A * | 2/1973 | Zoemer et al. | B25B 21/02 173/105 |
| 4,082,152 | A * | 4/1978 | Whitworth | B25D 11/102 172/123 |
| 4,533,337 | A | 8/1985 | Schoeps | |
| 4,635,731 | A | 1/1987 | Wallace et al. | |
| 4,683,961 | A | 8/1987 | Schoeps | |
| 4,884,995 | A | 12/1989 | Schoeps | |
| 5,083,619 | A * | 1/1992 | Giardino | B25B 21/02 173/104 |
| 5,147,245 | A | 9/1992 | Schoeps | |
| 5,492,185 | A | 2/1996 | Schoeps et al. | |
| 5,531,279 | A | 7/1996 | Biek | |
| 5,567,886 | A | 10/1996 | Kettner | |
| 5,673,758 | A * | 10/1997 | Sasaki | B25B 21/02 173/93.6 |
| 5,704,434 | A | 1/1998 | Schoeps | |
| 6,110,045 | A | 8/2000 | Schoeps | |
| 6,227,308 | B1 * | 5/2001 | Ghode | B25B 21/02 173/93.5 |
| 6,546,815 | B2 | 4/2003 | Yamada et al. | |
| 6,599,197 | B2 | 7/2003 | Tatsuno | |
| 6,708,778 | B2 | 3/2004 | Tokunaga | |
| 6,782,956 | B1 * | 8/2004 | Seith | B25B 21/026 173/206 |
| 7,032,685 | B2 | 4/2006 | Nakamizo | |
| 7,647,986 | B2 | 1/2010 | Kettner | |
| 7,703,546 | B2 | 4/2010 | Kettner | |
| 7,784,562 | B2 * | 8/2010 | Ikuta | B25D 17/24 173/48 |
| 7,980,321 | B2 * | 7/2011 | Happ | B25B 21/023 173/128 |
| 8,042,621 | B2 * | 10/2011 | Barezzani | B25B 21/02 173/93.5 |
| 8,905,154 | B2 | 12/2014 | Uemura | |
| 9,289,886 | B2 * | 3/2016 | Limberg | B25B 23/1405 |
| 9,643,301 | B2 | 5/2017 | Chen | |
| 9,878,435 | B2 | 1/2018 | Ito | |
| 9,983,044 | B2 | 5/2018 | Nelson et al. | |
| 10,118,282 | B2 | 11/2018 | Öberg | |
| 11,027,404 | B2 * | 6/2021 | Malak | B22F 3/26 |
| 11,213,934 | B2 * | 1/2022 | Bandy | B25B 23/1475 |
| 11,472,007 | B2 | 10/2022 | Tatsuno | |
| 2001/0010268 | A1 | 8/2001 | Tokunaga et al. | |
| 2006/0086513 | A1 * | 4/2006 | Hashimoto | B25D 11/062 173/48 |
| 2009/0133894 | A1 | 5/2009 | Mizuhara | |
| 2010/0071924 | A1 * | 3/2010 | Schoeps | B25B 21/026 173/93.5 |
| 2012/0006573 | A1 | 1/2012 | Sugimoto | |
| 2012/0073845 | A1 * | 3/2012 | Nakamura | B25B 21/026 173/93.5 |
| 2012/0073846 | A1 | 3/2012 | Hirai et al. | |
| 2018/0272510 | A1 * | 9/2018 | Muramatsu | B25B 21/026 |
| 2019/0255687 | A1 * | 8/2019 | Schneider | B25B 21/02 |
| 2020/0023501 | A1 * | 1/2020 | Bandy | B25B 21/02 |
| 2020/0023503 | A1 * | 1/2020 | Malak | B23P 15/00 |
| 2020/0262035 | A1 | 8/2020 | Chang | |
| 2021/0031342 | A1 | 2/2021 | Takahagi | |
| 2021/0086333 | A1 * | 3/2021 | Murakami | B25B 23/1475 |
| 2021/0339361 | A1 * | 11/2021 | Abbott | B25B 21/026 |
| 2022/0097215 | A1 * | 3/2022 | Dales | B25B 21/026 |
| 2022/0105610 | A1 * | 4/2022 | Bandy | B25B 23/1453 |
| 2022/0193878 | A1 * | 6/2022 | Tomayko | B25B 21/02 |
| 2022/0226951 | A1 * | 7/2022 | Greunke | B25D 11/125 |
| 2022/0355446 | A1 | 11/2022 | Friberg | |
| 2023/0191566 | A1 * | 6/2023 | Kamiya | B25B 21/026 173/93 |
| 2023/0191567 | A1 * | 6/2023 | Opsitos, Jr. | B25B 21/023 81/464 |
| 2023/0294261 | A1 * | 9/2023 | Hartmann | B25D 17/06 173/90 |
| 2024/0308046 | A1 * | 9/2024 | Nick | B25B 21/026 |
| 2024/0326220 | A1 * | 10/2024 | Craig | B25F 5/001 |
| 2025/0042004 | A1 * | 2/2025 | Nick | B25B 21/02 |

FOREIGN PATENT DOCUMENTS

| | | | | |
|---|---|---|---|---|
| DE | 19506663 | A1 | 8/1996 | |
| DE | 19927809 | A1 | 12/2000 | |
| DE | 102022118159 | A1 * | 2/2023 | B25B 21/02 |
| DE | 102022209289 | A1 | 3/2024 | |
| WO | 2010147207 | A1 | 12/2010 | |

* cited by examiner

IMPACT TOOL WITH GAS SPRING

CROSS-REFERENCE TO RELATED APPLICATIONS

This application claims priority to co-pending U.S. Provisional Patent Application No. 63/455,013 filed on Mar. 28, 2023, the entire contents of which are incorporated herein by reference.

BACKGROUND

The present disclosure relates power tools, and more particularly to impact tools, such as impact drivers and impact wrenches.

Impact tools typically include an impact mechanism with a camshaft, a hammer, and an anvil. The hammer is typically biased toward the anvil by a coil spring. During operation, the hammer may move away from the anvil along the camshaft, compressing and storing energy in the coil spring. This energy is then released, propelling the anvil back toward the anvil while rotating the hammer about the camshaft. The amount of impact energy imparted from the hammer to the anvil is dependent upon the amount of energy that can be stored in the coil spring, which is in turn dependent upon the spring constant and compressible length of the coil spring.

SUMMARY

Embodiments described herein relate to an impact power tool including a housing, a motor disposed within the housing, a gear assembly disposed within the housing, and an impact mechanism disposed within the housing. The gear assembly driven by an output of the motor. The impact mechanism is driven by an output of the gear assembly. The impact mechanism includes a camshaft coupled to the output of the gear assembly, an anvil rotatably supported by the housing, a hammer coupled to the camshaft, and a chamber surrounding the camshaft. The camshaft is configured to rotate about a rotational axis. The anvil includes a drive portion able to receive a tool bit. The hammer is configured to rotate about the rotational axis and move axially along the camshaft to selectively apply rotational impacts to the anvil. The hammer is configured to move in a first direction away from the anvil in response to an axial force along the rotational axis. The chamber is filled with a compressible fluid. The hammer is configured to compress the compressible fluid as the hammer moves in the first direction. The compressible fluid applies a biasing force against the hammer in a second direction opposite to the first direction in response to the hammer reaching a maximum axial displacement from the anvil.

Embodiments described herein relate to an impact power tool including a housing including a sealed region filled with a compressible fluid, a motor disposed within the housing, a gear assembly disposed within the housing, an impact mechanism disposed within the housing. The gear assembly driven by an output of the motor. The impact mechanism driven an output of the gear assembly. The impact assembly includes a camshaft coupled to the output of the gear assembly, an anvil rotatably supported by the housing, and a hammer coupled to the camshaft. The camshaft configured to rotate about a rotational axis. The anvil includes a drive portion able to receive a tool bit. The hammer configured to rotate about the rotational axis and move axially along the camshaft to selectively apply rotational impacts to the anvil. The hammer is configured to move in a first direction away from the anvil in response to an axial force along the rotational axis. The hammer is also configured to compress the compressible fluid in the sealed region of the housing as the hammer moves in the first direction. The compressible fluid applies a biasing force against the hammer in a second direction opposite to the first direction in response to the hammer reaching a maximum axial displacement from the anvil.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
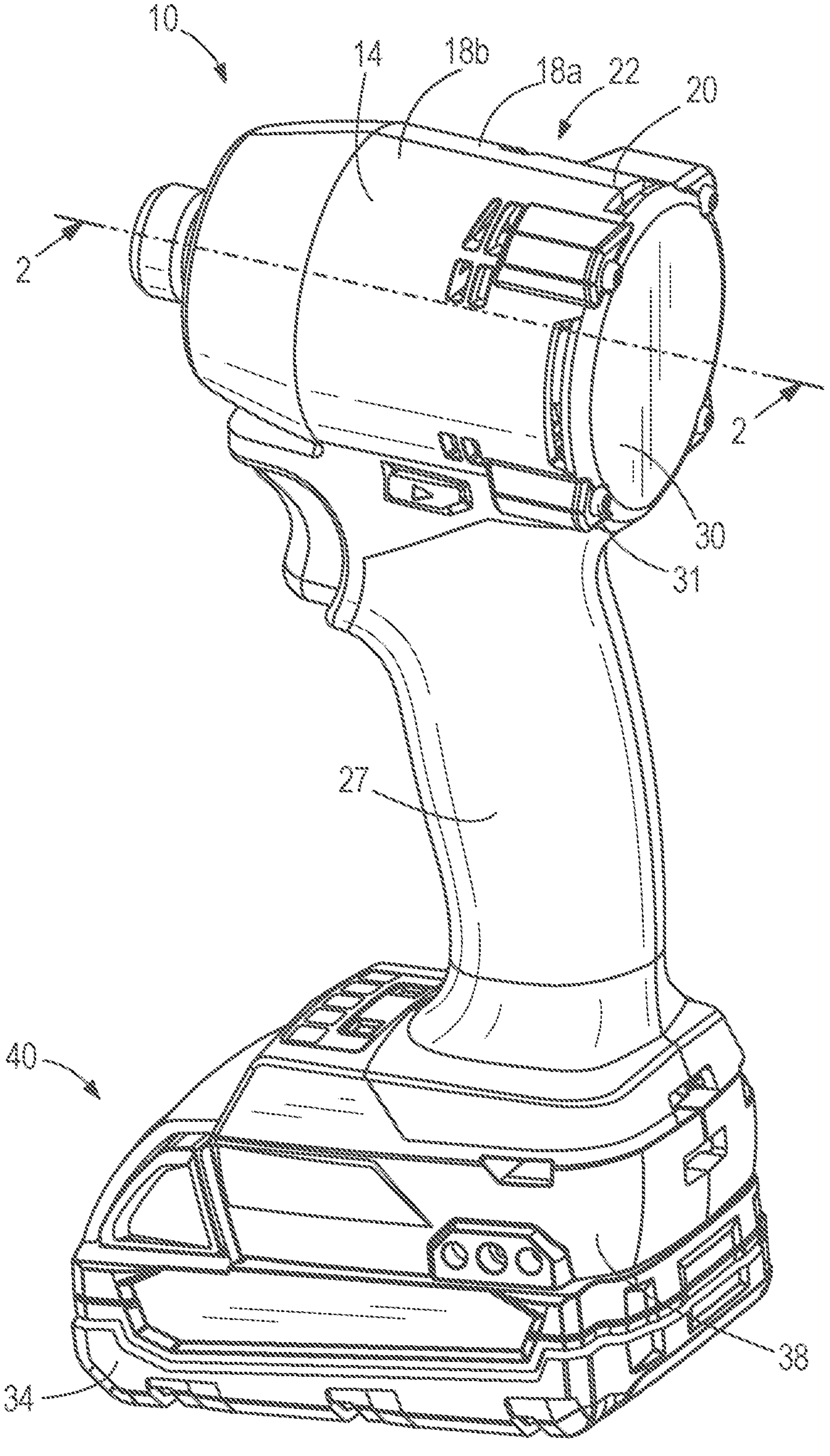
FIG. 1 is a perspective view of a power tool according to an embodiment of the present disclosure.
Figure 2:
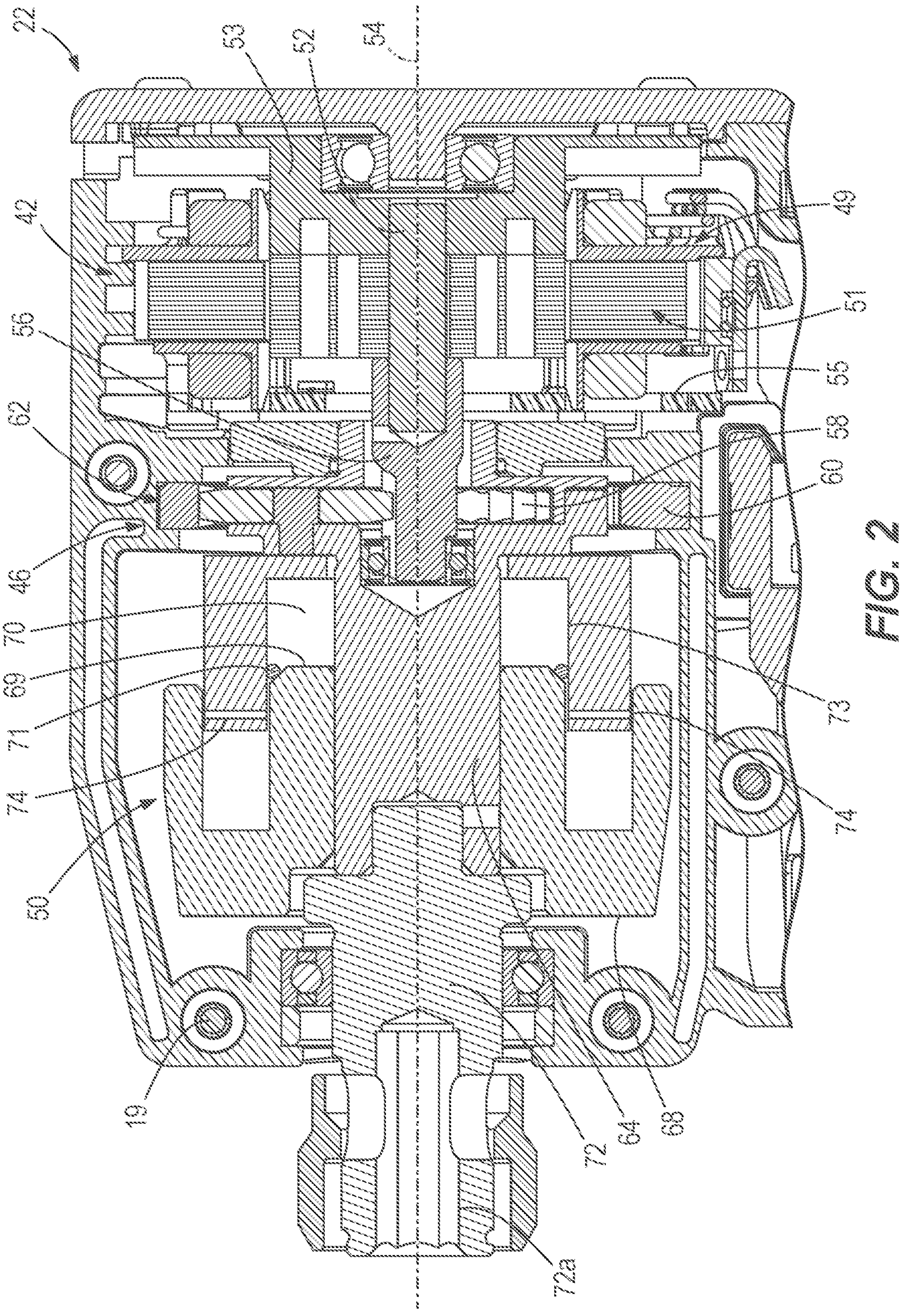
FIG. 2 is a partial cross-section view of the power tool of FIG. 1, taken along line 2-2.
Figure 3:
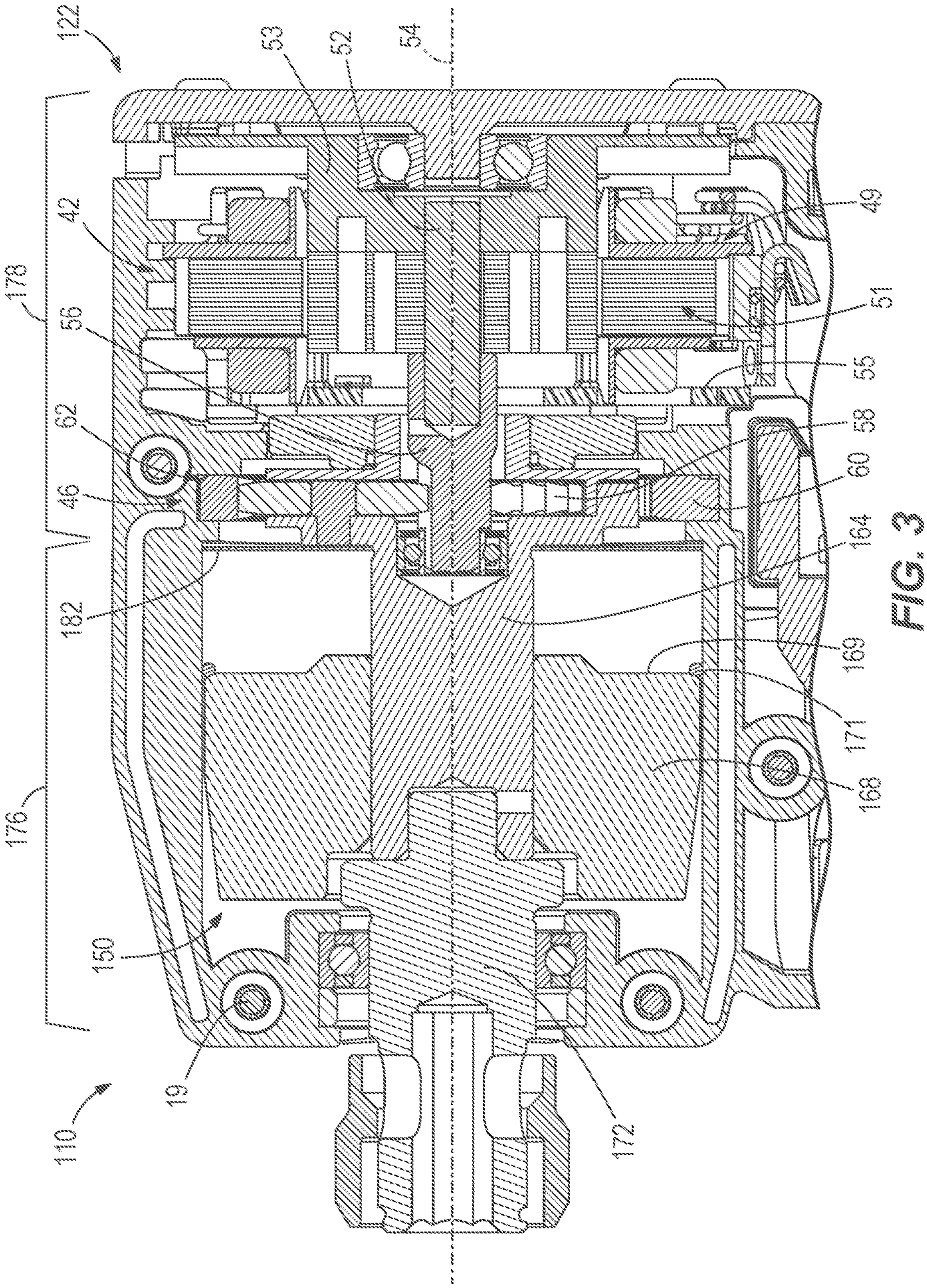
FIG. 3 is a partial cross-section view of the power tool of FIG. 1 according to another embodiment.

FIGS. 1 and 2 illustrate an embodiment of an impact power tool 10 in the form of a rotary impact tool, and, more specifically, an impact driver. The power tool 10 includes a housing 14 defined by cooperating first and second clamshell halves or housing portions 18*a*, 18*b* coupled together (e.g., by a first plurality of fasteners 19; FIGS. 2 and 3) at a parting plane or seam 20.

The housing 14 includes a head housing portion 22 and a handle portion 26 extending downwardly from the head housing portion 22. In the illustrated embodiment, the handle portion 26 is covered or surrounded by a grip portion 27. The illustrated housing 14 further includes an end cap 30 coupled to a rear portion of the head housing portion 22 (e.g., by a second plurality of fasteners 31). In the illustrated embodiment, the end cap 30 spans across both of the clamshell halves 18*a*, 18*b*. In other embodiments, the end cap 30 may be integrally formed with the head housing portion 22, such that the head housing portion 22 is defined entirely by the clamshell halves 18*a*, 18*b*.

The power tool 10 further includes a battery 34 removably coupled to a battery receptacle 38 located at a bottom end or foot 40 of the handle portion 26 (FIG. 1). A motor 42 (e.g., a brushless DC electric motor), a gear assembly 46, and an impact mechanism 50 are enclosed within the head housing portion 22 (FIG. 2). The motor 42 includes a stator 49 that is directly supported by the clamshell halves 18*a*, 18*b*. The stator 49 may include, for example, a stator frame and a plurality of coils or windings. The motor 42 further includes a rotor 51 comprising a plurality of laminations and embedded permanent magnets, an output shaft 52, and a fan 53. The output shaft 52 and the fan 53 are coupled for co-rotation with the rotor 51 about a rotational axis 54 relative to the stator 49. A sensor PCB 55, which includes a plurality of sensors (e.g., Hall-effect sensors) for detecting rotation of the rotor 51, is coupled to a front side of the frame of the stator 49.

The gear assembly 46 and impact mechanism 50 will now be described with reference to FIG. 2. In the illustrated embodiment, the gear assembly 46 includes a pinion 56 coupled to the output shaft 52, a plurality of planet gears 58 meshed with the pinion 56, and a ring gear 60 meshed with the planet gears 58. In some embodiments, the pinion 56, planet gears 58, and the ring gear 60 may be spur gears, helical gears, or other suitable types of gears. The ring gear 60 is rotationally fixed within a recess 62 in the head housing portion 22 and is directly supported by the clamshell halves 18*a*, 18*b*. In some embodiments, the ring gear 60 may include lugs that are received in additional recesses or grooves within the head housing portion 22 to further fix the ring gear 60 within the head housing portion 22. Other embodiments can also include a separate gear case housing portion to receive and fix the ring gear and thereby shroud the rest of the mechanism assembly.

The planet gears 58 are coupled to a camshaft 64 of the impact mechanism 50 such that the camshaft 64 acts as a planet carrier. Accordingly, rotation of the output shaft 52 rotates the planet gear 58, which then advance along the inner circumference of the ring gear 60 and thereby rotate the camshaft 64. The impact mechanism 50 further includes a hammer 68 supported on and axially slidable relative to the camshaft 64. The hammer 68 is coupled to the camshaft 64 via ball bearings (not shown) positioned within cooperating, generally helical grooves formed in the hammer 68 and camshaft 64. This connection causes the hammer 68 to move axially along the camshaft 64 in response to relative rotation between the camshaft 64 and the hammer 68.

With continued reference to FIG. 2, the illustrated impact tool 10 includes a chamber 70 at least partially sealed by a rear face 69 of the hammer 68, a seal 71 disposed between the hammer 68 and a wall 73 of the chamber 70, and an anvil 72. The anvil 72 has a drive portion 72*a*, which is a hexagonal bore configured to receive a hexagonal-shank of a tool bit in the illustrated embodiment. In other embodiments, the drive portion 72*a* may include other geometries for interfacing with a tool bit (not shown), such as a square-shaped end configured to receive a square-drive socket thereon.

The hammer 68 is configured to reciprocate axially along the camshaft 64 to deliver rotational impacts to the anvil 72 and thereby rotate the tool bit. The chamber 70 acts as a gas-spring to store potential energy as the hammer 68 moves in a first direction (i.e., away from the anvil 72) and to release the stored energy as kinetic energy, propelling the hammer 68 forward (i.e., in a second direction toward the anvil 72) to deliver a rotational impact to the anvil 72.

In the illustrated embodiment, the seal 71, which may be an elastomeric seal, such as an O-ring, is carried by the hammer 68 to seal between the hammer 68 and the wall 73 of the chamber 70. The elastomeric or other suitable form of seal may also be integrated into the wall of the chamber 70 in other embodiments. An additional seal (not shown) may be provided between the hammer 68 and the camshaft 64. Thus, as the hammer 68 moves in the first direction, the effective volume of the chamber 70 is decreased, and a compressible fluid in the chamber 70 (e.g., air, nitrogen, or any other compressible fluid) is compressed. The elevated pressure of the compressible fluid acts on the rear face 69 of the hammer 68 to exert a biasing or restoring force on the hammer 68. This restoring force propels the hammer 68 back toward the anvil 72 as the gas in the chamber 70 expands.

Also in the illustrated embodiment, the chamber 70 may include vents 74 to allow air to flow into and out of the chamber 70. The vents 74 fluidly connect the gas chamber 70 with atmospheric conditions of the environment and are positioned circumferentially on an outer surface of the chamber 70. As the hammer 68 moves in the first direction (i.e., away from the anvil 72), the rear face 69 of the hammer 68 may block the vents 74 and seal the chamber 70 with the seal 71. When the hammer 68 moves in the second direction, the rear face 69 of the hammer 68 may clear the vents 74 as the hammer 68 reaches the anvil 72 to reestablish communication between the chamber 70 and the atmosphere. In other embodiments, the vents 74 may be omitted, such that the chamber 70 remains sealed.

In some embodiments, a mechanical spring (e.g., a coil spring) may also be provided within the chamber 70 or any other suitable region of the impact tool 10 to supplement the restoring force of the gas-spring. The camshaft 64 extends through the chamber 70 in the illustrated embodiment; however, the chamber 70 be located elsewhere in other embodiments. In such embodiments, the hammer 68 may be coupled to a piston (via a mechanical connection or a fluid connection) to cause a piston to move within the chamber 70 and compress gas within the chamber 70.

In operation, lugs on the hammer 68 are configured to engage corresponding lugs on the anvil 72, so that the camshaft 64, hammer 68, and anvil 72 may all rotate together. However, when a reaction torque on the anvil 72 exceeds a predetermined limit, the anvil 72 and hammer 68 will stop rotating, while the camshaft 64 continues to rotate. The relative rotation between the camshaft 64 and the hammer 68 causes the hammer 68 to start retracting away from the anvil 72 in the first direction. As the hammer 68 moves in the first direction, the rear face 69 of the hammer 68 moves further into the chamber 70 and compresses the gas inside the chamber 70, which may initially be at atmospheric pressure or at a pressure above atmospheric pressure.

The hammer 68 continues to move away from the anvil 72 until it reaches a maximum axial displacement from the anvil 72 at which point the lugs on the hammer 68 clear the lugs on the anvil 72, releasing the hammer 68 and allowing it to rotate. The pressure in the chamber 70 is at its maximum when the hammer 68 is in its rearmost position, thus storing the maximum potential energy when the tool is performing its highest demanding applications. The elevated pressure of the compressed gas acts on the rear face 69 of the hammer 68 to exert a biasing or restoring force on the hammer 68. Once the hammer lugs have cleared the anvil lugs and the hammer 68 is free to rotate, the restoring force from the compressed gas propels the hammer 68 back toward the anvil 72 as the gas in the chamber 70 expands. The hammer 68 rotates as it moves along the camshaft 64, such that the hammer 68 may deliver a rotational impact to the anvil 72 and apply torque to a workpiece. Once the anvil 72 has been impacted, rotation of the hammer and anvil 72 may stop again, and the process repeats.

FIG. 3 shows an alternate embodiment of a rotary impact tool 110, with like parts to the rotary impact tool 10. The illustrated embodiment in FIG. 3 having like reference numerals plus "100," and differences are explained. The head housing portion 122 is divided into a sealed portion 176 and an unsealed portion 178 separated by a seal plate 182. The sealed portion 176 is filled with a compressible fluid and is fluidly sealed from the environment. In some embodiments, the compressible fluid is air, nitrogen, or another inert gas. The seal plate 182 corresponds to the shape of the interior of the head housing portion 122. Additionally, the head housing portion 122 houses the motor 42, the gear assembly 46, and an impact assembly 150. In the illustrated embodiment, the sealed portion 176 contains a portion of an anvil 172, a hammer 168, and a portion of a camshaft 164 of the impact assembly 150. The hammer 168 includes a seal 171 contacts the interior of the head housing portion 122. The seal 171 sections off the sealed portion 176 and prevents the compressible fluid from moving from moving past a rear surface 169 of the hammer 168. In the illustrated embodiment, the unsealed portion 178 houses the motor 42, the gear assembly 46, and a portion of the camshaft 164 of the impact assembly 150. In other embodiments, the motor 42, the gear assembly 46, and the impact assembly 150 may be arranged in different portions of the head housing portion 122.

In operation, lugs on the hammer 168 are configured to engage corresponding lugs on the anvil 172, so that the camshaft 164, hammer 168, and anvil 172 may all rotate together. However, when a reaction torque on the anvil 172 exceeds a predetermined limit, the anvil 172 and hammer 168 will stop rotating, while the camshaft 164 continues to rotate. The relative rotation between the camshaft 164 and the hammer 168 causes the hammer 168 to start retracting away from the anvil 172 in the first direction. As the hammer 168 moves in the first direction, a rear face 169 of the hammer 168 compresses the compressible fluid inside the sealed portion 176 of the head housing portion 122, which may initially be at atmospheric pressure or at a pressure above atmospheric pressure.

The hammer 168 continues to move away from the anvil 172 until the hammer 168 reaches a maximum axial displacement from the anvil 172. When the hammer 158 is at the maximum axial displacement from the anvil 172, the pressure in the sealed portion 176 is at a maximum, thus storing the maximum potential energy when the tool is performing its highest demanding applications. The elevated pressure of the compressed fluid acts on the rear face 169 of the hammer 168 to exert a biasing force on the hammer 168. Once the hammer lugs have cleared the anvil lugs and the hammer 168 is free to rotate, the restoring force from the compressed gas propels the hammer 168 back toward the anvil 172 as the compressible fluid in the sealed portion 176 expands. The hammer 168 rotates as it moves along the camshaft 164, such that the hammer 168 may deliver a rotational impact to the anvil 172 and apply torque to a workpiece. Once the anvil 172 has been impacted, rotation of the hammer and anvil 172 may stop again, and the process repeats.

Although the disclosure has been described in detail with reference to certain preferred embodiments, variations and modifications exist within the scope and spirit of one or more independent aspects of the disclosure as described.

Various features of the disclosure are set forth in the following claims.

What is claimed:

1. An impact power tool comprising:
a housing;
a motor disposed within the housing;
a gear assembly disposed within the housing, the gear assembly driven by an output of the motor; and
an impact mechanism disposed within the housing, the impact mechanism driven by an output of the gear assembly, the impact mechanism comprising:
a camshaft configured to rotate about a rotational axis,
an anvil rotatably supported by the housing, the anvil including a drive portion able to receive a tool bit,
a hammer coupled to the camshaft, the hammer is configured to rotate about the rotational axis and move axially along the camshaft to selectively apply rotational impacts to the anvil, and
a chamber surrounding the camshaft and able to receive a portion of the hammer, the chamber filled with a compressible fluid;
wherein the chamber includes a vent comprising a passage extending radially through a wall of the chamber,
wherein the hammer is configured to cover the vent, thereby sealing the chamber from atmospheric conditions, and to compress the compressible fluid as the hammer moves in a first direction away from the anvil,
wherein the compressible fluid applies a biasing force against the hammer in a second direction opposite to the first direction in response to the hammer reaching a maximum axial displacement from the anvil, and
wherein the hammer is configured to uncover the vent, thereby exposing the chamber to atmospheric conditions as the hammer moves in the second direction.

2. The impact power tool of claim 1, wherein the camshaft extends through the chamber.

3. The impact power tool of claim 1, wherein the vent is one of a plurality of vents configured to selectively fluidly connect an interior of the chamber with atmospheric conditions.

4. The impact power tool of claim 1, wherein the hammer includes a sealing feature insertable into the chamber to create a fluid tight seal.

5. The impact power tool of claim 1, wherein the compressible fluid is air.

6. The impact power tool of claim 1, wherein the impact mechanism includes a mechanical spring positioned within the chamber and configured to bias the hammer in the second direction.

7. An impact power tool comprising:
a housing, the housing including a sealed region filled with a compressible fluid;
a motor disposed within the housing;
a gear assembly disposed within the housing, the gear assembly driven by an output of the motor;
an impact mechanism disposed within the housing, the impact mechanism driven by an output of the gear assembly, the impact mechanism comprising:
a camshaft coupled to the output of the gear assembly, the camshaft configured to rotate about a rotational axis;
an anvil rotatably supported by the housing, the anvil including a drive portion able to receive a tool bit, and
a hammer coupled to the camshaft, the hammer configured to rotate about the rotational axis and move axially along the camshaft to selectively apply rotational impacts to the anvil;
wherein the hammer includes an inner periphery adjacent the camshaft, an outer periphery adjacent an inner wall of the housing, and a seal on the outer periphery of the hammer such that the seal contacts the inner wall of the housing to define a boundary of the sealed region,
wherein the hammer is configured to compress the compressible fluid in the sealed region of the housing as the hammer moves in a first direction away from the anvil, and
wherein the compressible fluid applies a biasing force against the hammer in a second direction opposite to the first direction in response to the hammer reaching a maximum axial displacement from the anvil.

8. The impact power tool of claim 7, wherein the sealed region includes a seal plate positioned between the hammer and the gear assembly.

9. The impact power tool of claim 8, wherein the camshaft extends through the seal plate.

10. The impact power tool of claim 8, wherein a shape of the seal plate corresponds to a shape of an inner volume of the housing.

11. The impact power tool of claim 8, wherein the seal plate extends from the inner wall of the housing to an outer surface of the camshaft.

12. The impact power tool of claim 7, wherein the compressible fluid is air.

13. An impact power tool comprising:

a housing;

a motor disposed within the housing;

a chamber within the housing containing a compressible fluid;

a gear assembly disposed within the housing, the gear assembly driven by an output of the motor;

an impact mechanism disposed within the housing, the impact mechanism driven by an output of the gear assembly, the impact assembly comprising:

a camshaft configured to rotate about a rotational axis;

an anvil rotatably supported by the housing, the anvil including a drive portion able to receive a tool bit, and a hammer coupled to the camshaft, the hammer configured to rotate about the rotational axis and move axially along the camshaft to selectively apply rotational impacts to the anvil, wherein the hammer is configured to compress the compressible fluid in the chamber as the hammer moves in a first direction away from the anvil, wherein the compressible fluid applies a biasing force against the hammer in a second direction opposite to the first direction in response to the hammer reaching a maximum axial displacement from the anvil, and wherein the impact mechanism does not include a mechanical spring such that the biasing force of the compressible fluid is the sole force acting to move the hammer in the second direction.

14. The impact power tool of claim 13, wherein the hammer includes an inner periphery adjacent the camshaft and an outer periphery adjacent an inner wall of the housing.

15. The impact power tool of claim 14, wherein the hammer includes a seal on the outer periphery of the hammer such that the seal contacts the inner wall of the housing.

16. The impact power tool of claim 13, wherein the chamber is fluidly sealed from atmospheric conditions at all positions of the hammer along the camshaft.

17. The impact power tool of claim 13, wherein the chamber includes a vent comprising a passage extending radially through a wall of the chamber, wherein the hammer is configured to cover the vent, thereby sealing the chamber from atmospheric conditions, as the hammer moves in the first direction, and wherein the hammer is configured to uncover the vent, thereby exposing the chamber to atmospheric conditions as the hammer moves in the second direction.

18. The impact power tool of claim 13, wherein the camshaft extends through the chamber.

* * * * *